United States Patent Office 3,562,303
Patented Feb. 9, 1971

3,562,303
PROCESS OF INCREASING THE GREEN STRENGTH OF HIGH-CIS POLYISO-PRENE RUBBERS AND FACILITATING THE FABRICATION THEREOF
Floyd M. Smith and Robert S. McFadden, Akron, Ohio, assignors to The Firestone Tire & Rubber Company, Akron, Ohio, a corporation of Ohio
No Drawing. Continuation-in-part of application Ser. No. 498,096, Oct. 19, 1965. This application Feb. 8, 1968, Ser. No. 703,886
Int. Cl. C08c 11/18
U.S. Cl. 260—41.5          6 Claims

ABSTRACT OF THE DISCLOSURE

A rubbery high-cis polymer or copolymer of isoprene is compounded with from about 0.1 to 0.3 of the amount of sulfur, and from about 0.1 to about 0.5 of the amount of accelerator, normally requisite to effect vulcanization of the polymer or copolymer. The mixture is then briefly masticated at temperatures on the order of 275–350° F., cooled to temperatures below the vulcanizing range, and compounded at this lower temperature with sufficient additional vulcanizing agents to effect vulcanization at conventional vulcanizing temperature. The re-compounded material is then extruded, calendered or otherwise formed into sheets, tire tread plies, coated bead wires, coated cord plies or other similar components which are build into assemblies such as tires etc. and finally vulcanized at ordinary vulcanizing temperatures. The rubbery material, after the initial mastication, has greatly enhanced green strength which greatly facilitates the forming and building operations.

RELATED APPLICATIONS

This application is a continuation-in-part of the applicants' copending application Ser. No. 498,096 filed Oct. 19, 1965, now abandoned.

BRIEF DESCRIPTION OF THE INVENTION

Background of the invention

In recent years there have been developed isoprene polymers and copolymers in which the polymeric chains contain the isoprene residues largely in the cis-1,4 configuration. By reason of this structure, vulcanizates from these materials compare very favorably with vulcanizates of natural Hevea rubber. However, in unvulcanized state, these polymers and copolymers tend to lack the mechanical strength requisite to processing and fabricating operations necessarily carried out thereon prior to vulcanization. Typically, the maximum or "peak" stress which the unvulcanized materials will exhibit during deformation is rather low, and moreover, the stress drops off quite rapidly as the deformation continues beyond the point at which maximum stress is exhibited. Unvulcanized strips or other preforms of the material are apt to pull apart taffy-wise during processing or building operations carried out thereon.

Accordingly it is an object of this invention to improve the properties of high-cis polymers and copolymers of isoprene.

Another object is to improve the unvulcanized (green) strength of such polymers and copolymers.

A further object is to improve both the peak green strength of such polymers and copolymers, and also to maintain the strength of the polymers and copolymers during the continued deformation thereof all the way out to their final rupture.

A further object is to provide a process for attaining the foregoing objects, which process will be inexpensive, will require only a minimum of skilled supervision, and may be carried out with the use of inexpensive and readily available materials.

Synopsis of the invention

The above and other objects are secured, in accordance with this invention, by masticating a rubbery high-cis polymer or copolymer of isoprene, at temperatures on the order of 275–350° F. in the presence of from about 0.1 to about 0.3 of the amount of sulfur, and from about 0.1 to about 0.5 of the amount of accelerator, normally requisite to effect vulcanization of such polymers and copolymers. This will ordinarily work out to about 0.2–0.5 part by weight of sulfur, and about 0.03–0.6 part by weight of accelerator, per 100 parts by weight of the polymers or copolymers. The duration of the mastication is rather brief, say not over 5 minutes, and preferably 0.75–1.5 minutes. Following this initial mastication, the material is compounded with any further ingredients it may be desired to incorporate and also with the balance of the sulfur and of accelerator requisite to effect full vulcanization. Before this balance of sulfur and accelerator is added, the material is cooled to temperatures below scorching temperatures, say below 220° F. The material so compounded is then (preferably after cooling to ambient temperatures for convenient handling) pressed, extruded, calendered onto fabric or otherwise formed, plied, built and/or fabricated into the finally desired articles, and vulcanized by heating at conventional vulcanizing temperatures. By reason of the initial high temperature mastication, the compositions will exhibit very much enhanced green strength in the forming, plying, building and fabrication operations.

DETAILED DESCRIPTION OF THE INVENTION

The high-cis polymers and copolymers of isoprene

These may be any polymers of isoprene, or copolymers thereof with say, up to 30% of other unsaturated compounds copolymerizable therewith under the conditions requisite for obtaining these polymers and copolymers, wherein the polymeric chains, or the portions thereof, derived from isoprene have at least 85%, and preferably at least 92%, of the isoprene residues incorporated therein in the cis-1,4 configuration. Such polymers are produced, for instance, by polymerizing isoprene, or mixtures thereof with ethylenically unsaturated compounds copolymerizable therewith, in the presence of a lithium-based catalyst as disclosed in the Canadian patent of Forman et al. 705,506. High cis-1,4 polymers and copolymers of isoprene may also be prepared by polymerization of isoprene in the presence of coordination catalysts as disclosed in Belgian Pat. 551,851. Monomers which may be copolymerized with isoprene to yield copolymers which may advantageously be treated in accordance with this invention include other conjugated diolefins containing up to 6 carbon atoms, such as butadiene-1,3, piperylene, 2,3-dimethylbutadiene, and the vinyl substituted aromatic hydrocarbons such as styrene, alpha-methyl styrene, O-, p- and m-methyl and ethyl styrene and the like.

The accelerators

These may be any of the accelerators conventionally employed to promote the vulcanization of unsaturated rubbers by sulfur, such as the thiazole type accelerators on the order of mercaptobenzothiazole, benzothiazyl disulfide, the zinc salt of mercaptobenzothiazole, N-cyclohexyl benzothiazole-2-sulfenamide, N-oxydiethylenebenzothiazole - 2 - sulfenamide; thiazolene-type accelerators on the order of 2-mercaptothiazolene; thiuram disulfides such as tetramethylthiuram monosulfide and disulfide; dithiocarbamates such as zinc dimethyl and dibutyl dithiocarbamates, selenium diethyl dithiocarbamates, and piperidinium pentamethylene dithiocarbamate; mercaptoimidazolidines such as 2-mercaptoimidazolidine; diarylguanidines such as diphenylguanidine, diorthotolylguanidine, diphenylguanidine phthalate; and the like. These accelerators vary considerably in activity, and the more active ones should be used in lesser proportions, and the less active ones in greater proportions. In general, in the initial hot-mastication step, any given accelerator should be employed in an amount from about 0.1 to about 0.5 of the amount of that accelerator ordinarily used in a rubber compound designed for vulcanization. As a rough rule, this will generally work out to approximately 0.03 to 0.6 part by weight of the accelerator per 100 parts by weight of the polymer or copolymer to be treated. It will be understood that subsequent to the initial hot-mastication step and before final vulcanization, the balance of the requisite amount of accelerator will be added (e.g. the deficit 0.9 of the requisite amount if only 0.1 of the requisite accelerator was added in the initial mastication; 0.5 of the requisite amount if 0.5 of this amount was added; and so on).

Initial hot-mastication with deficient vulcanizing agents

The treatment of the invention consists in masticating the isoprene polymer or copolymer together with the indicated deficient amounts of sulfur and of accelerator (i.e., about 0.1 to about 0.3 of the sulfur, and about 0.1 to about 0.5 of the accelerator normally requisite to effect vulcanization) at temperatures conventionally used for the vulcanization of such materials, say 275–350° F. and preferably 290–335° F. Preferably the treatment is not prolonged beyond four or five minutes, and preferably not more than about one minute, at the maximum temperature of treatment. A convenient apparatus for carrying out the mastication is the well-known banbury mixer, although other devices such as roll-mills, screw type mixers and the like may be employed. Typically with the use of a banbury mixer, it will be preheated to say 110–150° F., and the cold ingredients charged thereto. The rotors are set in motion to masticate the ingredients, and the temperature brought up rapidly by frictionally generated heat and, if desired, by external heat supplied to the casing of the banbury mixer, to the peak temperature of treatment, say 275–350° F., and preferably 290–335° F. Mastication is continued at the peak temperatutre, with external cooling if needed to keep the temperature within the desired range for a short time, say one-half to five minutes, preferably three-quarters to two minutes. Following this initial hot mastication, the composition may be dumped and cooled for storage, or it may be incorporated with additional compounding agents without intermediate cooling. Before final use, the composition may be further compounded with any desired further non-vulcanization-inducing ingredients (lubricants, reinforcing pigments, stabilizers, antioxidants, etc.) and of course must be compounded with the balance of the sulfur and accelerator not added in the initial hot-mastication but requisite to final vulcanization. For example, 0.1 of the amount of sulfur requisite for final vulcanization is added in the initial mastication, then the deficit of 0.9 of this amount must be added in final compounding; or if 0.3 of the requisite sulfur is added in the initial mastication, then the deficit of 0.7 of the requisite amount must be added; and so on, for intermediate situations. Similarly if only 0.1 of the requisite accelerator is added in the initial mastication, the deficit 0.9 must be made up; if 0.5 of the requisite accelerator is added in the initial mastication, the deficit of 0.5 of the requisite accelerator must be made up. At some point before the addition of the balance of sulfur and accelerator, the temperature of the mixture must be reduced to a value less than the scorching temperature, say below 220° F., and kept below this temperature throughout the addition of sulfur and accelerator and the forming and fabrication operations, until the final vulcanization.

Properties and further compounding and processing of the treated polymers and copolymers The polymers treated by initial hot-mastication as described above may be further handled just like any raw polymer, i.e., they may be compounded on conventional equipment with further amounts of sulfur, accelerators and/or vulcanizing agents, reinforcing agents such as carbon blacks, silica, zinc oxide, lubricants, plasticizers, etc. to develop the desired properties in the final vulcanizates. These compounding, forming, calendering and building operations will at all points subsequent to the addition of the sulfur and accelerators (other than the sulfur and accelerators added in the initial hot-mastication) be conducted at temperatures below the scorching temperature of the compounded rubber, say below 220° F., at temperatures customary with ordinary high-cis polymers and copolymers of isoprene, for the compounding and forming operations, and ordinary ambient room temperatures, say 5°–45° C. for building, laying-up, plying etc. operations. The articles fabricated by such building, laying-up and plying operations are then subjected to the usual vulcanizing conditions to produce the final desired vulcanized articles.

As contrasted to the untreated high-cis polymers and copolymers of isoprene, the treated materials have much superior strength in the uncured state, which greatly facilitates the processing and fabrication thereof. Particularly, building operations are facilitated, the materials having good resistance to the vigorous handling involved in calendering, and laying-up plies and extruded sections and treads in constructing tires, collapsible containers and the like. The properties of the final vulcanizates are in every way comparable to vulcanizates made from the untreated materials.

With the foregoing general discussion in mind, there are given herewith detailed examples of the practice of this invention. All parts given are by weight, unless a specific contrary indication is given.

EXAMPLE I (A) Pre-treatment of polyisoprene

| | Parts |
|---|---|
| Polyisoprene (polymerized by alkyl lithium catalyst; dilute solution viscosity 13.1; 93.9% cis-1,4 structure) | 100 |
| Phenyl beta-naphthylamine | 1.0 |
| N-cyclohexylbenzothiazole - 2-sulfenamide ("Santocure NS," a product of Monsanto Chemical Co.) | 0.2 |
| Sulfur | 0.2 |

A 25-pound (nominal designation) Banbury mixer was preheated to 150° F. running free. Twenty-eight pounds of the above formulation were then charged, the cooling water turned on when the charge temperature reached 310° F., and the temperature allowed to rise to 340° F., at which temperature the batch was held for one minute. The batch was then dumped.

(B) Evaluation

The polymer treated as described at (A) above was then evaluated, in a recipe as set forth in Table I below, in parallel with the identical polymer without the treatment described at (A). The unvulcanized compounded stocks were molded in a press to 100 gauge thickness, and test specimens die cut therefrom and pulled on an Instron tensile machine. The peak stress, ultimate stress and elongation at break are recorded. Likewise the Mooney scorch times at 265° F. were determined. The compounds were then vulcanized at 300° F. for 15 minutes, and the mechanical properties were determined. Set forth herewith are the results of the evaluation.

TABLE I

| Recipe (parts) | Treated polymer | Untreated polymer |
|---|---|---|
| Polymer treated per (A) | 100 | |
| Untreated polymer | | 100 |
| Phenyl beta-naphthylamine | | 1.0 |
| HAF black | 40.0 | 40.0 |
| FEF black | 26.0 | 26.0 |
| Zinc oxide | 3.0 | 3.0 |
| Stearic acid | 2.0 | 2.0 |
| Amberol ST137X [1] | 1.0 | 1.0 |
| Piccopale 100 [2] | 15.0 | 15.0 |
| N-cyclohexylbenzothiazole-2-sulfenamide | 1.5 | 1.9 |
| Sulfur masterbatch [3] | 2.0 | 2.25 |
| Uncured properties: | | |
| Mooney Scorch at 265° F.: | | |
| $T_1$ | 10.6 | 17.0 |
| $T_{10}$ | 14.7 | 24.0 |
| $V_m$ | 23.5 | 24.0 |
| Green strength: [4] | | |
| At peak, lbs | 5.9 | 3.6 |
| At break, lbs | 5.9 | 1.4 |
| Elongation, percent | 1,100 | 825 |
| Cured properties (300° F., 15 min.): | | |
| Tensile strength, p.s.i. | 3,175 | 3,050 |
| Modulus, 300%, p.s.i. | 2,150 | 2,200 |
| Elongation, percent | 420 | 410 |
| Tensile strength at 275° F., p.s.i. | 1,640 | |
| Elongation at 275° F., percent | 460 | |

[1] A phenol-formaldehyde resin manufactured by Rohm & Haas Co.
[2] A petroleum hydrocarbon resin, polymer of aliphatic olefins having 100° C. M.P., manufactured by Pennsylvania Industrial Chemical Corp.
[3] A masterbatch of 80% sulfur, 20% oil.
[4] These are machine readings and were not calculated back to a "per inch" basis. All samples were pressed and die cut to the same dimensions.

EXAMPLE II

(A) Pretreatment of polyisoprene in the presence of black

| | |
|---|---|
| Polyisoprene (polymerized by alkyl lithium catalyst; dilute solution viscosity 10.8) | 100 |
| Sulfur | 0.5 |
| Santocure NS | 0.2 |
| Phenyl-beta-naphthylamine | 1 |
| FEB black | 26 |
| | 127.7 |

Approximately 2.8 lbs. of the above formulation were charged to a laboratory size Banbury mixer preheated to 300° F. and the temperature allowed to rise during mastication from internally generated heat. Cooling water was turned through the mixer jacket at 290° F. and the temperature of the batch allowed to reach 320° F., at which temperature the batch was held one minute and then dumped.

(B) Evaluation

The polymer treated as described at (A) above was then evaluated in comparison with the same polymer untreated as shown in Table II. The improvement in green strength is shown by the higher peak and breaking strength obtained with the treated polymer under "Green Strength."

TABLE II

| Recipe (parts) | Treated polymer | Untreated polymer |
|---|---|---|
| Treated polymer masterbatch per B | 127.7 | |
| Untreated polymer | | 100 |
| HAF black | 40 | 40 |
| FEF black | 26 | 26 |
| Zinc oxide | 3 | 3 |
| Stearic acid | 2 | 2 |
| Amberol St137X [1] | 1 | 1 |
| Piccopale 100 [2] | 15 | 15 |
| N-cyclohexylbenzothiazole-2-sulfenamide | 1.5 | 1.9 |
| Sulfur masterbatch [3] | 1.63 | 2.25 |
| N-nitrosodiphenylamine | 1 | 1 |
| Uncured properties: | | |
| Mooney scorch at 265° F.: | | |
| $T_1$ | 7.5 | 16 |
| $T_{10}$ | 13.6 | 27.6 |
| $V_m$ | 26.5 | 27 |
| Green Strength: [4] | | |
| At peak, lbs | 4.75 | 3.53 |
| At break, lbs | 4.75 | 0.85 |
| Elongation, percent | 875 | 800 |
| Stress-strain properties, 15 min. at 300° F.: | | |
| 300% modulus, p.s.i. | 2,225 | 2,050 |
| Tensile strength, p.s.i. | 3,125 | 3,325 |
| Ultimate elongation, percent | 410 | 470 |
| Tensile strength at 275° F., p.s.i. | 1,530 | 1,530 |
| Ultimate elongation at 275° F., percent | 370 | 440 |

[1] A phenol-formaldehyde resin manufactured by Rohm & Haas Co.
[2] A petroleum hydrocarbon resin, polymer of aliphatic olefins having 100° C. M.P., manufactured by Pennsylvania Industrial Chemical Corp.
[3] A masterbatch of 80% sulfur, 20% oil.
[4] These are machine readings and were not calculated back to a "per inch" basis. All samples were pressed and die cut to the same dimensions.

EXAMPLE III

Variation of sulfur, accelerator and temperature in treatment

A series of samples of the same basic polyisoprene employed in Example I was treated, varying the amount of sulfur and of accelerator from run to run, and also varying the temperature of treating, as set forth below in Tables III-A and III-B. In each run a laboratory Brabender mixer was preheated to 275° F. The parts by weight ingredients as listed under "Treatment Variations" in the tables were then charged, together with 100 parts by weight of the polyisoprene, and the temperature raised to 310 or 340° F. as indicated under "Treating Conditions" in Tables III-A and III-B respectively and held there for one minute, at the end of which time the batch was dumped and sheeted for cooling. The treated polymers were then further compounded as indicated under "Compound Recipe." Green strength properties of the unvulcanized compounds were then determined and are recorded in Tables III-A and III-B. Other portions of these same compounds were vulcanized at 300° F. for 15 minutes. The stress-strain properties of the vulcanizates were determined and also recorded in Tables III-A and III-B.

TABLE III-A.—EFFECT OF SULFUR, CYCLEX B RATIO ON TREATMENT OF POLYISOPRENE FOR GREEN STRENGTH IMPROVEMENT

[Treating Conditions: 1 minute at 340° F.]

| Treatment ingredient variations (parts by weight): | | | | | | | | |
|---|---|---|---|---|---|---|---|---|
| Phenyl beta-naphthylamine | 1 | 1 | 1 | 1 | 1 | 1 | 1 | 1 |
| N-cyclohexylbenzothiazole sulfenamide | 0.5 | 0.5 | 0.5 | 0.2 | 0.4 | 0.3 | 0.2 | |
| Sulfur | 0.4 | 0.3 | 0.2 | 0.2 | 0.5 | 0.5 | 0.5 | |
| Compound recipe (parts by weight): | | | | | | | | |
| Basic recipe [1] | 187 | 187 | 187 | 187 | 187 | 187 | 187 | 187 |
| Sulfur masterbatch [2] | 2.25 | 1.75 | 1.88 | 2.0 | 2.0 | 1.63 | 1.63 | 1.63 |
| N-cyclohexylbenzothiazole sulfenamide | 1.7 | 1.2 | 1.2 | 1.2 | 1.5 | 1.3 | 1.4 | 1.5 |
| Green Strength Data [3]: | | | | | | | | |
| Peak modulus, lbs | 3.0 | 3.45 | 6.15 | 3.7 | 3.2 | 11.0 | 13.2 | 7.75 |
| Breaking modulus, lbs | 0.7 | 3.2 | 6.15 | 3.4 | 3.0 | 11.0 | 13.2 | 7.75 |
| Elongation at break, percent | 1,100 | 1,000 | 850 | 1,450 | 1,225 | 650 | 550 | 650 |
| Stress-strain properties—Cured 15' at 300° F.: | | | | | | | | |
| 300% modulus, p.s.i. | 2,050 | 1,850 | 1,775 | 1,825 | 1,775 | 1,700 | 1,800 | 1,800 |
| Tensile strength, p.s.i. | 2,875 | 2,850 | 2,975 | 2,975 | 3,050 | 2,725 | 2,475 | 2,550 |
| Ultimate elongation, percent | 415 | 405 | 450 | 470 | 465 | 450 | 395 | 400 |

[1] In parts by weight: 100 polymer (treated or untreated), 40 HAF black, 26 FEF black, 15 Piccopale 100 resin (a petroleum hydrocarbon resin, polymer of aliphatic olefins, having a 100° C. M.P. manufactured by Pennsylvania Industrial Chemical Corp.), 1 Amberol (a phenol-formaldehyde resin manufactured by Rohm & Haas Co.) ST137X, 3 zinc oxide, 2 stearic acid, 1 Vultrol (n-nitroso diphenylamine).
[2] A masterbatch of 80% sulfur, 20% oil.
[3] These are machine readings, not calculated back to a "per inch" basis. All samples were pressed and die cut to the same dimensions.

TABLE III-B.—EFFECT OF SULFUR—CYCLEX B RATIO ON TREATMENT OF POLYISOPRENE FOR GREEN STRENGTH IMPROVEMENT

[Treating Conditions: 1 minute at 310° F.]

| Treatment ingredient variations (parts by weight): | | | | | | | | | |
|---|---|---|---|---|---|---|---|---|---|
| Phenyl beta-naphthylamine | 1 | 1 | 1 | 1 | 1 | 1 | 1 | 1 | |
| N-cyclohexylbenzothiazole sulfenamide | | 0.5 | 0.5 | 0.5 | 0.2 | 0.4 | 0.3 | 0.2 | |
| Sulfur | | 0.4 | 0.3 | 0.2 | 0.2 | 0.5 | 0.5 | 0.5 | |
| Compound recipe (parts by weight): | | | | | | | | | |
| Basic Recipe [1] | 187 | 187 | 187 | 187 | 187 | 187 | 187 | 187 | 187 |
| Sulfur Masterbatch [2] | 2.25 | 1.75 | 1.88 | 2.0 | 2.0 | 1.63 | 1.63 | 1.63 | 2.25 |
| N-cyclohexylbenzothiazole sulfenamide | 1.7 | 1.2 | 1.2 | 1.2 | 1.5 | 1.3 | 1.4 | 1.5 | 1.7 |
| Green strength data [3]: | | | | | | | | | |
| Peak modulus, lbs | 3.2 | 2.8 | 2.9 | 3.1 | 3.1 | 3.9 | 4.0 | 3.8 | 2.8 |
| Breaking modulus, lbs | 0.7 | 2.5 | 1.7 | 0.9 | 1.5 | 3.6 | 3.8 | 3.6 | 1.5 |
| Elongation at break, percent | 1,200 | 1,225 | 1,200 | 1,250 | 1,450 | 1,250 | 1,050 | 1,325 | 900 |
| Stress-strain properties—Cured 15' at 300° F.: | | | | | | | | | |
| 300% modulus, p.s.i | 1,975 | 1,875 | 1,900 | 1,925 | 1,975 | 1,975 | 2,025 | 2,050 | 1,975 |
| Tensile strength, p.s.i | 3,275 | 3,175 | 3,225 | 3,225 | 3,250 | 3,250 | 3,300 | 3,275 | 3,075 |
| Ultimate elongation, percent | 475 | 500 | 480 | 480 | 480 | 470 | 480 | 490 | 445 |

[1] In parts by weight: 100 polymer (treated or untreated), 40 HAF black, 26 FEF black, 15 Piccopale 100 resin (a petroleum hydrocarbon resin, polymer of aliphatic olefins, having a 100° C. M.P. manufactured by Pennsylvania Industrial Chemical Corp.), 1 Amberol (a phenol-formaldehyde resin manufactured by Rohm & Haas Co.) ST137X, 3 zinc oxide, 2 stearic acid, 1 Vultrol (n-nitroso diphenylamine).

[2] A masterbatch of 80% sulfur, 20% oil.

[3] These are machine readings, not calculated back to a "per inch" basis. All samples were pressed and die cut to the same dimensions.

EXAMPLE IV

A production size batch of compounded rubber was prepared in accordance with the pretreatment of Example I and recipe of Table I under "Treated Polymer," with the exception that in the recipe half of the treated polymer was replaced with commercial SBR. This compound was calendered onto a tire cord fabric to form a tire body ply. This fabric was then built into a passenger tire, in which building operation the calendered body ply exhibited excellent tack and excellent strength in handling. The tire so built was vulcanized and tested on a machine in which the tire, mounted on an arbor, is driven at a peripheral speed of 31 miles per hour by a 10 inch cylindrical drum bearing on the periphery thereof. This is designed to test the resistance of the tire to tread separation, and the tire prepared as just described failed at 8791 miles. An endurance of 5000 miles is generally regarded as good performance. By way of comparison, a tire made from a similar formulation in which the treated polyisoprene was replaced by natural rubber failed at 5077 miles.

From the foregoing general description and detailed specific experimental examples it will be evident that this invention provides a novel and inexpensive means for the improvement of the unvulcanized strength and processability of high-cis isoprene polymers and copolymers. The final vulcanized products obtained from the treated materials are suitable for all of the uses for which rubbery materials are used, as in tires, vibration mountings, power transmission belting, buffers, weather-stripping and the like.

What is claimed is:

1. Process which comprises first, increasing the green strength of an elastomer selected from the group consisting of polymers of isoprene and copolymers of isoprene with up to 30% by weight of a copolymerizable monomer selected from the group consisting of butadiene-1,3, piperylene, 2,3-dimethylbutadiene, styrene, alpha-methyl styrene and o-, p- and m-methyl and ethyl styrene, at least 85% of the isoprene residues in said elastomer being incorporated therein in cis-1,4 configuration and said elastomer having been produced by polymerization with an alkyl lithium catalyst wherein the alkyl group contains 1–40 carbon atoms by masticating a mixture of said elastomer with from 0.1 to 0.3 of the amount of sulfur required to effect vulcanization of said elastomer and from 0.1 to 0.5 of the amount of accelerator required to effect such vulcanization for a duration of time of from 0.75 to 1.5 minutes at temperatures in the range of 225°–350° F., thereafter cooling to temperatures below 220° F. the elastomer, which has increased green strength as a result of the above-recited processing, thereafter further compounding the elastomer with additional quantities of sulfur sufficient to effect full vulcanization, thereafter building the elastomer into the article to be fabricated therefrom, and thereafter vulcanizing the fabricated article by subjecting the same to vulcanizing temperature for a duration of time sufficient to effect vulcanization.

2. Process according to claim 1, wherein the sulfur is employed to the extent of 0.2–0.5 part by weight per 100 parts by weight of the elastomer.

3. Process according to claim 1, wherein the accelerator is employed to the extent of 0.03–0.6 part by weight per 100 parts by weight of the elastomer.

4. Process according to claim 3, wherein the sulfur is employed to the extent of 0.2–0.5 part by weight per 100 parts by weight of the elastomer.

5. Process according to claim 4, wherein the maximum temperature of treatment is 290–335° F.

6. Process according to claim 5, wherein the mastication is carried out in a Banbury mixer which is preheated to about 100°–140° F., the elastomer, sulfur and accelerator are charged, the charge masticated and brought up to the maximum temperature within 5 minutes, the charge masticated at the maximum temperature for about 0.75–1.0 minute, and the charge dumped and cooled.

References Cited

UNITED STATES PATENTS

| 2,461,953 | 2/1949 | Bargmeyer | 260—79.5 |
| 2,494,766 | 1/1950 | Lightbrown et al. | 260—85.3 |
| 3,234,166 | 2/1966 | Hecker | 260—41.5X |

FOREIGN PATENTS

| 955,200 | 4/1964 | Great Britain | 260—41.5 |

MORRIS LIEBMAN, Primary Examiner

T. MORRIS, Assistant Examiner

U.S. Cl. X.R.

260—79.5, 785, 786, 793, 7s7

O-1050 (5/69)

UNITED STATES PATENT OFFICE
CERTIFICATE OF CORRECTION

Patent No. 3,562,303  Dated February 9, 1971

Inventor(s) Floyd M. Smith and Robert S. McFadden

It is certified that error appears in the above-identified patent and that said Letters Patent are hereby corrected as shown below:

Col. 5, line 36, "FEB" should read --FEF--

Col. 8, line 24, "225°" should read --255°--

Signed and sealed this 25th day of January 1972.

(SEAL)
Attest:

EDWARD M. FLETCHER, JR.
Attesting Officer

ROBERT GOTTSCHALK
Commissioner of Paten